(12) United States Patent
Blake et al.

(10) Patent No.: US 12,019,952 B2
(45) Date of Patent: *Jun. 25, 2024

(54) SYSTEMS AND METHODS FOR SWITCHING OPERATIONAL MODES BASED ON AUDIO TRIGGERS

(71) Applicant: Rovi Guides, Inc., San Jose, CA (US)

(72) Inventors: John Blake, Belmont, CA (US); Paul T. Stathacopoulos, San Carlos, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,154

(22) Filed: Jan. 19, 2021

(65) Prior Publication Data

US 2021/0165631 A1    Jun. 3, 2021

Related U.S. Application Data

(63) Continuation of application No. 16/018,908, filed on Jun. 26, 2018, now Pat. No. 10,929,097.

(51) Int. Cl.
| | |
|---|---|
| *G10L 15/00* | (2013.01) |
| *G06F 3/16* | (2006.01) |
| *G06F 16/61* | (2019.01) |
| *G06F 16/683* | (2019.01) |
| *G08C 23/02* | (2006.01) |
| *G10L 15/26* | (2006.01) |
| *G10L 21/00* | (2013.01) |
| *G10L 25/00* | (2013.01) |

(Continued)

(52) U.S. Cl.
CPC ............ *G06F 3/167* (2013.01); *G06F 16/61* (2019.01); *G06F 16/683* (2019.01); *G08C 23/02* (2013.01); *G10L 25/54* (2013.01); *G10L 25/78* (2013.01); *G10L 25/18* (2013.01); *G10L 25/21* (2013.01)

(58) Field of Classification Search
CPC ......... G10L 17/00; G10L 17/04; G10L 25/51; G10L 15/26; G10L 17/06; G10L 25/78; G10L 15/24; G10L 21/0272; G10L 2015/223; G06F 21/32; G06F 3/167; G06F 3/165
See application file for complete search history.

(56) References Cited

U.S. PATENT DOCUMENTS

| | | | | |
|---|---|---|---|---|
| 4,450,531 | A * | 5/1984 | Kenyon ................ | H04H 60/58 725/19 |
| 9,098,467 | B1 * | 8/2015 | Blanksteen ............ | G10L 15/22 |

(Continued)

*Primary Examiner* — Olujimi A Adesanya
(74) *Attorney, Agent, or Firm* — HALEY GUILIANO LLP

(57) ABSTRACT

Systems and methods are provided for enabling different modes of operation based on a detected audio trigger. The systems and methods may generate an audio signature for a detected first sound and compare the audio signature with a plurality of registered audio signatures. In response to determining that the audio signature matches a first registered audio signature, the systems and methods may enable a first operational mode for a device that enables a first plurality of commands In response to determining that the audio signature matches a second registered audio signature, the systems and methods may enable a second operational mode for a device that enables a second plurality of commands, where the second plurality of commands are different from the first plurality of commands.

20 Claims, 10 Drawing Sheets

(51) Int. Cl.
*G10L 25/54* (2013.01)
*G10L 25/78* (2013.01)
*G10L 25/18* (2013.01)
*G10L 25/21* (2013.01)

(56) References Cited

U.S. PATENT DOCUMENTS

| | | | | |
|---|---|---|---|---|
| 9,317,721 | B2* | 4/2016 | Plagemann | G06F 21/82 |
| 9,460,715 | B2* | 10/2016 | Hart | G10L 15/22 |
| 10,453,460 | B1* | 10/2019 | Wightman | G10L 15/20 |
| 10,536,286 | B1* | 1/2020 | Leblang | H04L 12/1818 |
| 10,929,097 | B2* | 2/2021 | Blake | G10L 25/54 |
| 2014/0280265 | A1* | 9/2014 | Wang | H04L 67/01 |
| | | | | 707/758 |
| 2014/0297287 | A1* | 10/2014 | Newman | G10L 25/93 |
| | | | | 704/275 |
| 2015/0112682 | A1* | 4/2015 | Rodriguez | G10L 17/26 |
| | | | | 704/249 |
| 2017/0060530 | A1 | 3/2017 | Maker | |
| 2017/0270919 | A1* | 9/2017 | Parthasarathi | G10L 17/18 |
| 2017/0351367 | A1* | 12/2017 | Popovich | G06F 3/016 |
| 2018/0190296 | A1* | 7/2018 | Williams | G10L 17/00 |
| 2018/0240463 | A1 | 8/2018 | Perotti | |
| 2018/0321905 | A1* | 11/2018 | Fountaine | G06F 3/165 |
| 2018/0349494 | A1* | 12/2018 | Zhao | H04N 21/8352 |
| 2018/0366126 | A1* | 12/2018 | Nicholson | G10L 17/22 |
| 2019/0043492 | A1* | 2/2019 | Lang | G06F 3/165 |
| 2019/0206395 | A1* | 7/2019 | Aoki | G10L 15/30 |
| 2019/0206396 | A1* | 7/2019 | Chen | G10L 15/22 |
| 2019/0250881 | A1* | 8/2019 | Lee | G10L 15/20 |
| 2019/0272825 | A1* | 9/2019 | O'Malley | G10L 15/20 |
| 2019/0325870 | A1* | 10/2019 | Mitic | G10L 15/22 |
| 2019/0341034 | A1* | 11/2019 | Dunning | G10L 15/26 |
| 2019/0348034 | A1* | 11/2019 | Bender | G10L 15/08 |
| 2019/0371341 | A1* | 12/2019 | Schwindt | G10L 17/04 |

* cited by examiner

SYSTEMS AND METHODS FOR SWITCHING OPERATIONAL MODES BASED ON AUDIO TRIGGERS

CROSS REFERENCE TO RELATED APPLICATIONS

This application is a continuation of U.S. patent application Ser. No. 16/018,908, filed Jun. 26, 2018, the entire contents of which is incorporated by reference herein in its entirety.

BACKGROUND

The use of smart voice assistant devices is rapidly increasing. A user will commonly activate such devices by pronouncing a key phrase (e.g., "Hey Siri").

As these devices become more integrated with users' everyday digital experiences, users may desire to activate these devices without using key phrases, based on different detected audio triggers. However, it may be difficult for a system to determine without a key phrase whether a command or a sound is meant for the system or is just background noise or conversation. Additionally, the system may require prohibitively large amounts of processing power in order to continuously listen for a potentially infinite number of commands without a key phrase to first enable the listening for those commands. As a result, potential command interpretation is difficult without significantly increasing processing power, and conventional systems continue to require a key phrase in order to start listening for all commands

SUMMARY

A system that uses context-dependent audio triggers to enable activation of a particular set of commands is desirable to reduce processing power that would otherwise be needed to listen to all commands at all times. Accordingly, systems and methods are disclosed herein for enabling different modes of operation for smart voice assistants based on different audio triggers, where an audio trigger may be a non-speech sound. Specifically, an audio signature for a detected first sound (e.g., an alarm sound) may be generated. The audio signature may be compared with a plurality of audio signatures. It may be determined whether the audio signature matches any audio signature of the plurality of audio signatures. If it is determined that the audio signature matches a first audio signature of the plurality of audio signatures, a first input mode for a device may be switched to, where the first input mode enables a first plurality of commands In some embodiments, the first plurality of commands may comprise fewer commands than the total number of commands. If it is determined that the audio signature matches a second audio signature of the plurality of audio signatures, a second input mode for a device may be switched to, where the second input mode enables a second plurality of commands that is different from the first plurality of commands. In some embodiments, the second plurality of commands may be different from the first plurality of commands and comprise fewer commands than the total number of commands Enabling listening for certain commands and not others in response to different triggers saves processing power for the device (e.g., a smart voice assistant) by requiring the device to listen for only a limited set of enabled commands, rather than a potentially infinite number of commands. Additionally, enabling the device to listen for a set of commands based on a context-dependent audio trigger (e.g., an alarm sound, or train announcement sound) enhances the user interface of the device by allowing a user to issue some context-appropriate command without the need to utter a key phrase that would activate listening for all commands, which would require a much larger processing power expenditure.

In some embodiments, a media guidance application may perform the actions necessary to enable a mode of operation based on an audio trigger. The media guidance application may reside on a user's equipment, on a server, on any other digital device, or on any combination thereof In some embodiments, these actions may be performed outside of a media guidance application using a combination of hardware and software.

In some embodiments, the media guidance application may, upon detecting an audio input, generate an audio signature for the audio input. Specifically, the media guidance application may generate a first audio signature for a detected first sound. In some embodiments, an audio signature may include a time-domain representation of the sound. In other embodiments, an audio signature may include a frequency-domain representation of the sound, e.g., a spectrogram. In one example, the media guidance application may detect an announcement over the PA system in a subway car and generate an audio signature for the announcement. In another example, the media guidance application may detect a microwave alarm sound and generate an audio signature for the alarm sound.

The media guidance application may compare the generated audio signature with a group of known audio signatures. Specifically, the media guidance application may compare the first audio signature with each of a plurality of registered audio signatures. For example, the media guidance application may compare the audio signature generated for the subway car announcement with each of a group of registered audio signatures. In another example, the media guidance application may compare the audio signature generated for the microwave alarm sound with each of the group of registered audio signatures.

The media guidance application may determine whether the generated audio signature matches any of the audio signatures in the group of known audio signatures. Specifically, the media guidance application may determine, based on comparing the first audio signature with each of the plurality of registered audio signatures, whether the first audio signature matches any of the plurality of registered audio signatures. For example, the media guidance application may determine whether the audio signature generated for the subway car announcement matches any of the group of known audio signatures. In another example, the media guidance application may determine whether the audio signature generated for the microwave alarm sound matches any of the group of known audio signatures.

The media guidance application may, upon detecting a match between the generated audio signature and one of the known audio signatures, retrieve a list of commands available in an operational mode triggered by the generated audio signature. Specifically, in response to determining that the first audio signature matches a first registered audio signature of the plurality of registered audio signatures, the media guidance application may retrieve a first plurality of commands associated with the first registered audio signature. For example, the media guidance application may, upon determining that the audio signature of the subway announcement matches one of the group of known audio signatures, retrieve a list of commands associated with the matching known audio signature for the subway announcement. The list of commands may, for example, include a command to pause playback, a command to retrieve and display walking directions to a destination, and a command to switch to an audio-only media asset.

The media guidance application may, upon detecting a match between the first generated audio signature and one of the known audio signatures, generate an audio signature for a subsequent audio input. Specifically, further in response to determining that the first audio signature matches a first registered audio signature of the plurality of registered audio signatures, the media guidance application may generate a second audio signature for a detected second sound. For example, following the determination that the subway announcement corresponds to a known audio signature, the media guidance application may detect an utterance of the phrase "navigate to doctor's office" and generate an audio signature for the utterance.

The media guidance application may determine whether the generated audio signature for the subsequent audio input matches any of the retrieved list of commands available in the operational mode triggered by the first generated audio signature. Specifically, the media guidance application may determine, based on the second audio signature, whether the second sound matches any of the first plurality of commands. For example, the media guidance application may determine whether the audio signature generated for an utterance of the phrase "navigate to doctor's office" matches any of a command to pause playback, a command to retrieve and display walking directions to a destination, and a command to switch to an audio-only media asset.

The media guidance application may, upon determining that the audio signature of the subsequent audio input matches one of the retrieved commands, execute the matching command. Specifically, based on determining that the second sound matches a first command of the first plurality of commands, the media guidance application may execute the first command. For example, the media guidance application may determine that the audio signature for the utterance of the phrase "navigate to doctor's office" matches the command to retrieve and display walking directions to a destination. The media guidance application may then execute the command, for example by entering the destination's address into a navigational application and displaying the results to a user.

The media guidance application may, upon determining that the audio signature of the subsequent audio input does not match one of the retrieved commands, refrain from taking any action based on the subsequent audio input. Specifically, based on determining that the second sound does not match any of the first plurality of commands, the media guidance application may refrain from taking any action based on the second sound. For example, the media guidance application may determine that the audio signature for the utterance of the phrase "navigate to doctor's office" does not match any of the commands associated with the audio signature of the subway announcement and refrain from taking any action based on the utterance.

The media guidance application may, upon detecting a match between the first generated audio signature and another of the known audio signatures, retrieve a different list of commands available in an operational mode triggered by the first generated audio signature. Specifically, in response to determining that the first audio signature matches a second registered audio signature of the plurality of registered audio signatures, the media guidance application may retrieve a second plurality of commands associated with the second registered audio signature, where the second plurality of commands is different from the first plurality of commands For example, the media guidance application may, upon determining that the audio signature of the microwave alarm sound matches one of the group of known audio signatures, retrieve a list of commands associated with the matching known audio signature for the microwave alarm sound, where the list of commands associated with the matching known audio signature for the microwave alarm sound is different from the list of commands associated with the audio signature for the subway announcement. The lists may differ completely, meaning that the lists do not share any common commands, or the lists may differ in part, meaning at least one command is in one list and not the other list. For example, the list associated with the audio signature for the microwave alarm sound may include a command to pause playback, a command to resume playback, and a command to increase volume of playback, while the list associated with the audio signature for the subway announcement may include a command to pause playback, a command to retrieve and display walking directions to a destination, and a command to switch to an audio-only media asset.

The media guidance application may, upon detecting a match between the first generated audio signature and another of the known audio signatures, generate an audio signature for a subsequent audio input. Specifically, further in response to determining that the first audio signature matches a second registered audio signature of the plurality of registered audio signatures, the media guidance application may generate a third audio signature for a detected third sound. For example, further in response to determining that the audio signature of the microwave alarm sound matches one of the group of known audio signatures, the media guidance application may detect an utterance of the word "play" and generate an audio signature for the utterance.

The media guidance application may determine whether the generated audio signature for the subsequent audio input matches any of the retrieved list of commands available in the operational mode triggered by the first generated audio signature. Specifically, the media guidance application may determine, based on the third audio signature, whether the third sound matches any of the second plurality of commands. For example, the media guidance application may determine whether the audio signature generated for an utterance of the word "play" matches any of a command to pause playback, a command to resume playback, and a command to increase volume of playback.

The media guidance application may, upon determining that the audio signature of the subsequent audio input matches one of the retrieved commands, execute the matching command. Specifically, based on determining that the third sound matches a second command of the second plurality of commands, the media guidance application may execute the second command. For example, the media guidance application may determine that the audio signature for the utterance of the word "play" matches a command to resume playback, which is included in the list of commands associated with the microwave alarm sound. The media guidance application may execute the command, for example by resuming playback of media content on a user device.

The media guidance application may, upon determining that the audio signature of the subsequent audio input does not match one of the retrieved commands, refrain from taking any action based on the subsequent audio input. Specifically, based on determining that the third sound does not match any of the second plurality of commands, the media guidance application may refrain from taking any action based on the third sound. For example, the media guidance application may determine that the audio signature for the utterance of the word "play" does not match any of the commands associated with the audio signature of the microwave alarm sound and refrain from taking any action based on the utterance. By selectively enabling only context-appropriate commands based on an audio trigger (for example, based on the microwave alarm sound, enabling only a command to pause playback, a command to resume playback, and a command to increase volume of playback), and disabling commands that are not context-appropriate, the media guidance application may achieve a significant reduction in power over the processing power that would be required to enable all possible commands Additionally, since the power requirement is reduced, the user interface of the device is significantly improved by allowing the device to process at least some commands without the need for a user to pronounce a specific activation phrase that would enable listening for all commands.

In some embodiments, the media guidance application may only generate an audio signature for a first sound to compare to known audio signatures and enable an operational mode if the first sound is non-verbal. Specifically, the media guidance application may determine whether the first sound comprises speech. For example, the media guidance application may determine whether the frequency range of the first sound falls within a human voice frequency range (e.g., 85 to 180 Hz for men or 165 to 255 Hz for women) to determine whether the first sound comprises speech. The media guidance application may generate the first audio signature only if the first sound does not comprise speech. For example, the media guidance application may, upon detecting a microwave alarm sound is the first sound, determine that the microwave alarm sound does not comprise speech and generate an audio signature for the microwave alarm sound. In another example, the media guidance application may, upon detecting that a subway announcement comprising speech is the first sound, determine that the subway announcement comprises speech and refrain from generating an audio signature for the subway announcement.

In some embodiments, the media guidance application may extract frequency and average power information from a spectrogram of the first generated audio signature for the first audio input. In some embodiments, the media guidance application (or any other combination of software and hardware) may generate the spectrogram of an audio signature for an audio input by performing a Fourier transform (e.g., a fast Fourier transform) on a time-domain representation of the audio input. Specifically, the media guidance application may extract, from a first spectrogram of the first audio signature, a first peak point corresponding to a first frequency and first average power. For example, the media guidance application may extract a first peak point corresponding to a first frequency and first average power from a spectrogram of the audio signature generated for the subway announcement.

The media guidance application may extract frequency and average power information from a spectrogram of a known audio signature. Specifically, the media guidance application may extract, from a spectrogram of a registered audio signature, a second peak point corresponding to a second frequency and second average power. For example, the media guidance application may extract a second peak point corresponding to a second frequency and second average power from a spectrogram of a known audio signature in the list of known audio signatures.

The media guidance application may determine a difference between the frequency value of the first audio input and the frequency value of the known audio signature. Specifically, the media guidance application may determine a frequency difference value between the first frequency and the second frequency. For example, the media guidance application may subtract the first frequency corresponding to the audio signature of the subway announcement from the second frequency corresponding to the known audio signature, take the absolute value of the difference, and determine the result to be the frequency difference value.

In some embodiments, the media guidance application may determine a difference between the average power value of the first audio input and the average power value of the known audio signature. Specifically, the media guidance application may determine a power difference value between the first average power and the second average power. For example, the media guidance application may subtract the first average power corresponding to the audio signature of the subway announcement from the second average power corresponding to the known audio signature, take the absolute value of the difference, and determine the result to be the power difference value.

In some embodiments, the media guidance application may determine whether the difference between the frequency of the first audio input and the frequency of the known audio signature is less than a given amount. Specifically, the media guidance application may determine whether the frequency difference value is less than a first threshold. The media guidance application may, for example, retrieve the first threshold from storage or request the first threshold from a server. For example, the media guidance application may determine whether the frequency difference value is less than a user-set threshold of, for example, 10 hertz (Hz).

In some embodiments, the media guidance application may determine whether the difference between the average power of the first audio input and the average power of the known audio signature is less than a given amount. Specifically, the media guidance application may determine whether the power difference value is less than a second threshold. The media guidance application may, for example, retrieve the second threshold from storage or request the second threshold from a server. For example, the media guidance application may determine whether the power difference value is less than a system-defined threshold of, for example, 5 decibels (dB).

In some embodiments, the media guidance application may, upon determining that both the frequency difference value is less than a given amount and the power difference value is less than another given amount, determine that the audio signature of the first audio input matches the known audio signature. Specifically, based on determining that both the frequency difference value is less than a first threshold and the power difference value is less than a second threshold, the media guidance application may determine that the first audio signature matches a registered audio signature of the plurality of registered audio signatures. For example, based on determining that the frequency difference value and the power difference value for the subway announcement and the known audio signature are both under a respective threshold, the media guidance application may determine that the audio signature for the subway announcement matches the known signature.

In some embodiments, the media guidance application may generate a request for the commands associated with the first audio signature of the first audio input. Specifically, the media guidance application may generate a request for the first plurality of commands, wherein the request includes an identifier of the first registered audio signature. For example, the media guidance application may generate a request that includes an identifier of the first registered audio signature that matched the audio signature of the subway announcement. The identifier may be, for example, an alphanumeric string or a hexadecimal code. In another example, the identifier may be an encoded version of the first registered audio signature.

The media guidance application may transmit the request for the commands associated with the first audio signature of the first audio input. Specifically, the media guidance application may transmit the request to a database that stores registered audio signatures and corresponding commands. For example, the media guidance application may transmit the request to a database that has a first entry, where the first entry comprises the first registered audio signature matching the audio signature of the subway announcement and a first list of associated commands. For example, the database may have an entry comprising the registered audio signature matching the subway announcement and a list of commands including a command to pause playback, a command to retrieve and display walking directions to a destination, and a command to switch to an audio-only media asset.

The media guidance application may receive the requested commands. Specifically, the media guidance application may receive, in response to the request, the first plurality of commands associated with the first registered audio signature. For example, the media guidance application may receive the list of commands associated with the first registered audio signature matching the audio signature of the subway announcement.

In some embodiments, the media guidance application may receive a data structure including the first registered audio signature and the corresponding commands Specifically, the media guidance application may receive a data structure for the first registered audio signature, where the data structure comprises a first field for the first registered audio signature and a second field that comprises a plurality of command audio signatures, each for a corresponding command in the plurality of commands. For example, the media guidance application may receive a data structure including a first field for the first registered audio signature that matches the subway announcement audio signature and a second field comprising audio signatures of commands corresponding to the first registered audio signature.

The media guidance application may retrieve each command from the received data structure. Specifically, the media guidance application may retrieve, from the second field of the data structure, each of the plurality of command audio signatures. For example, the media guidance application may iterate through the audio signatures of commands corresponding to the first registered audio signature and store each command audio signature in local memory.

In some embodiments, the media guidance application may determine whether the subsequent audio input matches any of the retrieved commands associated with the first audio input by comparing the audio signature of the subsequent audio input with the audio signature of each command. Specifically, the media guidance application may determine whether the second sound matches any of the first plurality of commands by comparing the second audio signature for the second sound with each of the plurality of command audio signatures. For example, the media guidance application may iterate through the list of command audio signatures and compare each one with the audio signature of the subsequent audio input to determine whether there is a match. The media guidance application may compare the audio signatures by determining whether the frequency difference of peak points of the audio signatures and the average power difference of peak points of the audio signatures are below respective thresholds.

In some embodiments, the media guidance application may receive a database entry that includes the command and a corresponding action. Specifically, the media guidance application may receive a database entry associated with the first command, wherein the database entry comprises the second audio signature and a corresponding action. For example, the media guidance application may receive a database entry comprising the audio signature of the utterance of the word "play" and the corresponding action of resuming playback of media content on a device.

The media guidance application may retrieve the action from the database entry. Specifically, the media guidance application may retrieve, from the database entry, the corresponding action. For example, the media guidance application may retrieve the action of resuming playback of media content on a device and add it to a queue of actions to perform. In some embodiments, the action may comprise a set of instructions or routines.

The media guidance application may perform the action. Specifically, the media guidance application may perform the corresponding action. For example, the media guidance application may resume playback of media content on a user device.

In some embodiments, the media guidance application may determine that the first audio input is not known to the system. Specifically, the media guidance application may determine, based on comparing the first audio signature with each of the plurality of registered audio signatures, that the first audio signature does not match any of the plurality of registered audio signatures. For example, the media guidance application may compare the sound of a fire alarm to each of the known audio signatures and determine that the sound has not been registered as a known audio signature.

The media guidance application may provide the user with an option to register the unknown sound. Specifically, the media guidance application may generate for display, to a user, an option to store the first audio signature in the plurality of registered audio signatures. For example, the media guidance application may display, in a notification to the user, an option to register the sound of the fire alarm. The sound may be embedded in the notification so the user may play back the sound.

The media guidance application may determine whether the user has decided to register the unknown sound. Specifically, the media guidance application may determine whether the user has selected the option. For example, the media guidance application may determine whether an input associated with the notification (e.g., a touchscreen button) has been selected by the user.

The media guidance application may display a list of potential commands for the user to select to associate with the unknown sound. Specifically, based on determining that the user has selected the option, the media guidance application may generate for display a list of registered commands to associate with the first audio signature. For example, the media guidance application may display a list of commands from which the user can select a command to associate with the fire alarm sound. The list may include, for example, a command to make a phone call (e.g., to 911) and a command to turn on lights connected to a smart home system.

In some embodiments, the media guidance application may identify a category for the unknown sound. Specifically, the media guidance application may determine a category for the first audio signature, based on characteristics of the first audio signature. For example, the media guidance application may determine, from a spectrogram of the fire alarm sound, that the fire alarm sound falls under an "alarms" category.

The media guidance application may retrieve commands associated with the category of the unknown sound. Specifically, the media guidance application may retrieve a plurality of registered commands associated with the category. For example, the media guidance application may retrieve a list of commands associated with the "alarms" category, such as a command to pause media playback, a command to rewind media content by 30 seconds, a command to increase media playback volume, a command to make a phone call (e.g., to 911), a command to turn on lights connected to a smart home system, and a command to turn on a coffeemaker.

The media guidance application may display the commands associated with the category of the unknown sound to the user. Specifically, the media guidance application may generate for display a list of each of the plurality of registered commands. For example, the media guidance application may display the list of commands associated with the "alarms" category on the user's device display screen.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for enabling different modes of operation based on different audio triggers. A voice-activated device may detect a first sound, such as a PA system announcement or an alarm ringing. Users often react to certain environmental sounds by changing an aspect of how they are using their digital devices (for example, by changing playback settings of a video they are watching). For example, a user who watches videos on their mobile phone while riding the subway may consistently perform one of a given set of actions upon approaching their destination stop (for example, marked by a PA system announcement such as "The next stop is Fulton Street"). The set of actions may be, for example, pausing playback of a video, navigating to a destination, or switching from video playback to audio-only playback.

A voice-activated device may compare the detected first sound, such as the PA system announcement, with a set of registered sounds, where each registered sound enables a different operational mode, and each operational mode enables listening for a unique set of commands. If the detected first sound matches a registered sound, the systems and methods may retrieve the unique set of commands associated with the registered sound and switch to an operational mode enabled to listen for those commands. A voice-activated device may take action if one of the enabled commands is detected. For example, if one of the enabled commands is to pause playback, and the user says, "Pause," the system may pause playback. A voice-activated device may refrain from taking any action based on a detected command that is not one of the enabled commands. By selectively listening for only a small set of context-appropriate commands, based on an audio trigger, the systems and methods may reduce processing power required for command detection. Additionally, the user of the voice-activated device gains an ability to issue certain commands in certain situations without the need to pronounce an activating key phrase that would make the device listen for all possible commands.

As referred to herein, the term "audio signature" may refer to any kind of a digital or analog representation of a sound. For example, an audio signature may be a file, data, or data structure that stores time-domain sampling of an audio input. In another example, an audio signature may be a file, data, or data structure that stores a frequency-domain representation (e.g., a spectrogram) of an audio input. As referred to herein, the term "operational mode" may refer to a state of a device or a system where at least some capabilities of the device or the system are enabled and at least some capabilities of the device or system are disabled. For example, when operating in the first mode, a device or system may respond to at least some audio inputs and may refrain from responding to some other audio inputs.

Figure 1:
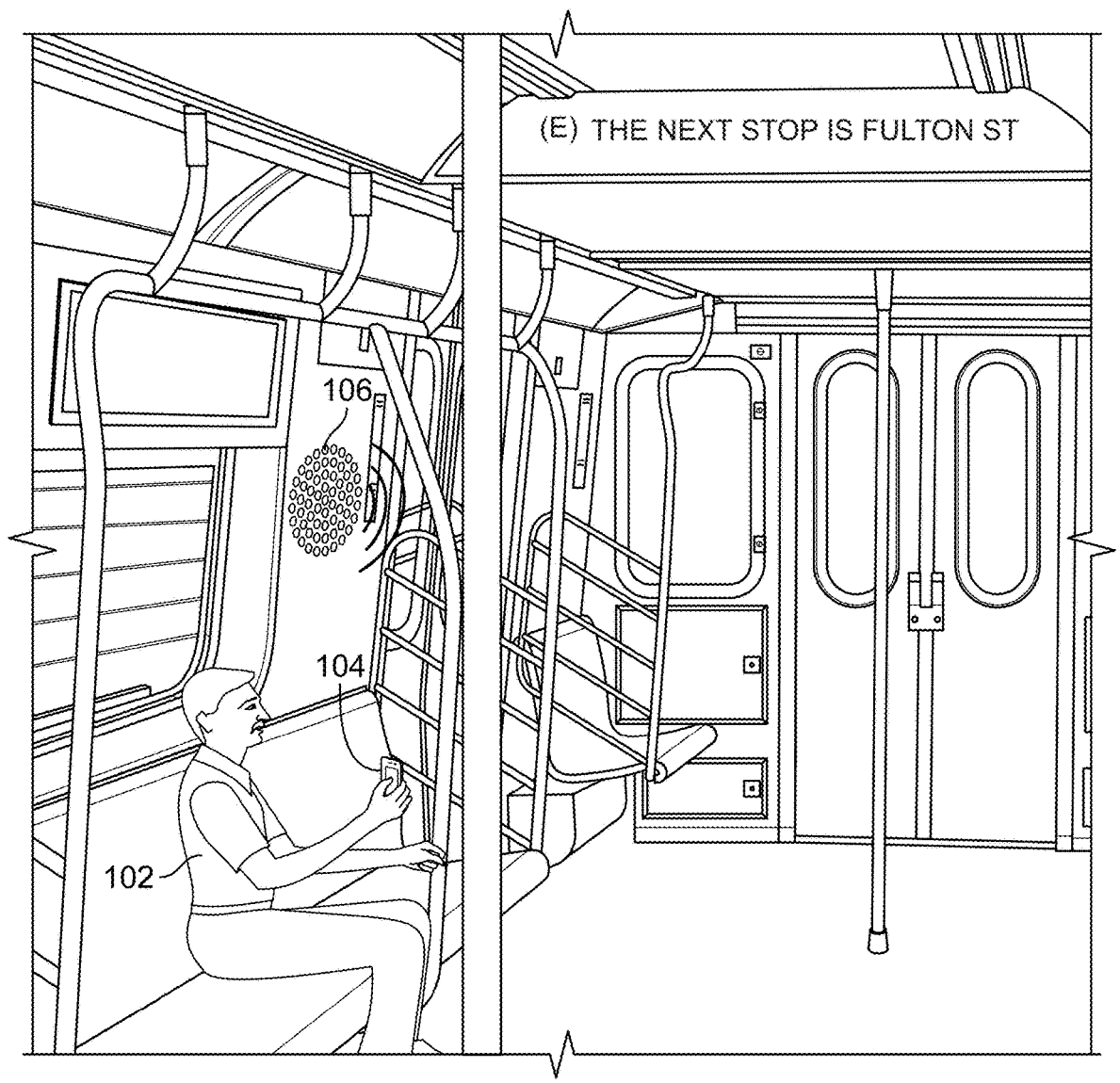
FIG. 1 shows an illustrative perspective view of a system for enabling different modes of operation based on an audio trigger, in accordance with some embodiments of the disclosure.

FIG. 1 shows an illustrative perspective view of a system for enabling different modes of operation based on an audio trigger, in accordance with some embodiments of the disclosure. For example, user 102 may be watching a video on user device 104 on a subway car. Public address (PA) system speaker 106 may be issuing an announcement (e.g., "The next stop is Fulton Street"). User device 104 may detect the subway announcement and generate a first audio signature for the subway announcement. For example, the generated first audio signature may comprise a time-domain representation or recording of the subway announcement. In another example, the generated first audio signature may comprise a frequency-domain representation, such as a spectrogram, of the subway announcement. User device 104 may generate the frequency-domain representation of the subway announcement by performing a Fourier transform on a time-domain representation. In another example, user device 104 may transmit an encoded time-domain representation of the subway announcement to a server and receive and decode a frequency-domain representation of the subway announcement.

User device 104 may compare the generated first audio signature for the subway announcement with each of a plurality of registered audio signatures. For example, the plurality of registered audio signatures may be stored locally on user device 104. In another example, the plurality of registered audio signatures may be retrieved from a remote server for comparison at user device 104. In another example, user device 104 may transmit the generated first audio signature to a server that compares, external to user device 104, the first audio signature with a plurality of registered audio signatures stored at the server.

User device 104 may compare the first audio signature with each registered audio signature by, for example, extracting a first peak point with a first frequency and first average power from a first spectrogram of the first audio signature, and extracting a second peak point with a second frequency and second average power from a second spectrogram of the second audio signature. User device 104 may determine a frequency difference value between the first frequency and the second frequency and a power difference value between the first average power and the second average power. Based on the comparing, user device 104 (or the remote server) may determine whether the first audio signature for the subway announcement matches any of the registered audio signatures. For example, the first audio signature may be determined to match a registered audio signature if the frequency difference value is under a first threshold (e.g., 100 Hz) and the power difference value is under a second threshold (e.g., 20 dB).

User device 104 may determine that the first audio signature for the subway announcement matches one of the registered audio signatures and, in response, switch to a first operational mode. User device 104 may retrieve a first plurality of commands associated with the first operational mode. For example, the first plurality of commands associated with the first operational mode for the subway announcement may include a command to pause playback, a command to retrieve and display walking directions to a destination, and a command to switch to an audio-only media asset.

User 102 may utter, for example, the phrase "navigate to doctor's office." User device 104 may detect the utterance as a second sound and generate a second audio signature for the second sound. In some embodiments, the generated audio signature may comprise a time-domain and/or frequency-domain representation of the sound.

User device 104 may determine whether the second sound matches a command of the retrieved first plurality of commands associated with the first operational mode for the subway announcement. For example, user device 104 may determine whether the utterance of the phrase "navigate to doctor's office" matches any of the list of commands comprising a command to pause playback, a command to retrieve and display walking directions to a destination, and a command to switch to an audio-only media asset. User device 104 may determine whether the second sound matches a command of the retrieved first plurality of commands by comparing frequency and power values of peak points of spectrograms of the sounds.

User device 104 may determine that the utterance "navigate to doctor's office" matches the command to retrieve and display walking directions to a destination from the list of commands associated with the subway announcement. Based on the determining, user device 104 may retrieve an action associated with the matching command and execute the action. For example, user device 104 may receive a database entry associated with the command, where the database entry comprises a corresponding action. For example, a corresponding action to the command to retrieve and display walking directions to a destination may comprise retrieving navigational directions to the address of the destination and generating for display the directions on user device 104. User device 104 may then execute the action. For example, the action may comprise a set of routines for the user device to execute (e.g., query a contacts list for the address of the destination, send a request to a remote server for directions to the destination, receive the directions, and display the directions on a user device display). User device 104 may execute the action by performing the set of routines.

User device 104 may determine that the utterance "navigate to doctor's office" does not match any command from the list of commands associated with the first operational mode triggered by the subway announcement. Based on the determining that the utterance does not match any command enabled by the first operational mode, user device 104 may refrain from taking any action based on identifying the second sound. For example, user device 104 may return to a listening state to detect another sound while still in the first operational mode. In another example, after a particular period of time (e.g., 30 seconds) has passed, user device 104 may return to a default operational mode (i.e., a listening state where no commands are enabled).

Figure 2:
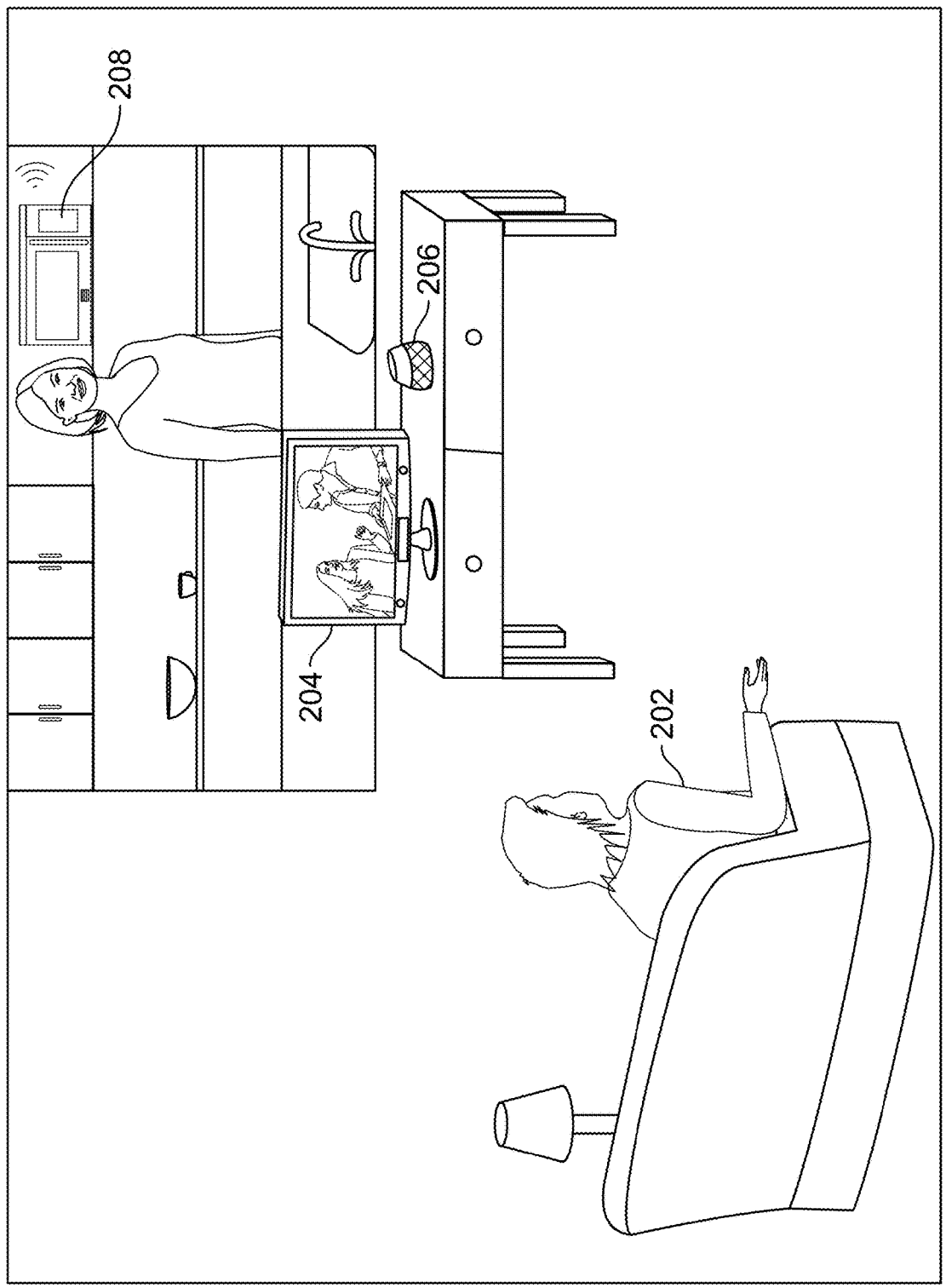
FIG. 2 shows another illustrative perspective view of a system for enabling different modes of operation based on an audio trigger, in accordance with some embodiments of the disclosure.

FIG. 2 shows another illustrative perspective view of a system for enabling different modes of operation based on an audio trigger, in accordance with some embodiments of the disclosure. In some embodiments, user 202 may be consuming media content (e.g., watching a television show or listening to music) on device 204, which is connected via a media guidance system to user device 206. User 202 may be the same user as user 102. User device 206 may be the same as user device 104 described in the example above. For example, user device 206 may, upon detecting the subway announcement described above (e.g., "The next stop is Fulton Street"), switch to a first operational mode enabled to listen for a command to pause playback, a command to retrieve and display walking directions to a destination, and a command to switch to an audio-only media asset, as described above. Further, user device 206 may, upon detecting a microwave alarm sound from microwave 208, generate an audio signature for the microwave alarm sound, compare the audio signature for the microwave alarm sound with each of the plurality of registered audio signatures, as described above, and determine that the audio signature for the microwave alarm sound matches a second registered audio signature of the plurality of audio signatures. User device 206 may determine that the audio signature for the microwave alarm sound matches a second registered audio signature by comparing frequency and power values of spectrograms of the audio signatures (for example, as described above).

User device 206 may, in response to determining that the audio signature for the microwave alarm sound matches a second registered audio signature of the plurality of audio signatures, switch to a second operational mode. User device 206 may retrieve a second plurality of commands associated with the second operational mode, where the second plurality of commands is different from the first plurality of commands for the first operational mode. For example, if the first plurality of commands includes a command to pause playback, a command to retrieve and display walking directions to a destination, and a command to switch to an audio-only media asset, the second plurality of commands may include a command to pause playback, a command to resume playback, and a command to increase volume of playback.

User 202 may utter, for example, the word "pause." User device 104 may detect the utterance as a third sound and generate a third audio signature for the third sound. The generated audio signature may comprise a time-domain and/or frequency-domain representation of the sound.

User device 206 may determine whether the third sound matches a command of the retrieved second plurality of commands associated with the second operational mode triggered by the microwave alarm sound. For example, user device 206 may determine whether the utterance of the word "pause" matches any of the list of commands comprising a command to pause playback, a command to resume playback, and a command to increase volume of playback. For example, user device 206 may determine whether the third sound matches a command of the retrieved second plurality of commands by comparing frequency and power values of peak points of spectrograms of the sounds.

User device 206 may determine that the utterance "pause" matches the command to pause playback from the list of commands associated with the second operational mode triggered by the microwave alarm sound. Based on the determining, user device 206 may retrieve an action associated with the matching command and execute the action. For example, user device 206 may receive a database entry associated with the command, where the database entry comprises a corresponding action, and execute the action. For example, a corresponding action to the command to pause playback may comprise determining that media content is playing back on device 204 and pausing playback of the media content.

User device 206 may determine that the utterance of "pause" does not match a command from the list of commands associated with the microwave alarm sound. Based on the determining, user device 206 may refrain from taking any action based on the third sound. For example, user device 206 may return to a listening state to detect another sound while still in the first operational mode. In another example, after a particular period of time (e.g., 30 seconds) has passed, user device 206 may return to a default operational mode (i.e., a listening state where no commands are enabled).

By enabling different commands for different situations, the user may quickly switch tasks or issue voice commands without the need for a key phrase. Selectively listening only for commands that are relevant for a situation and ignoring commands that are not relevant for the situation also reduces processing power consumption.

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 3:
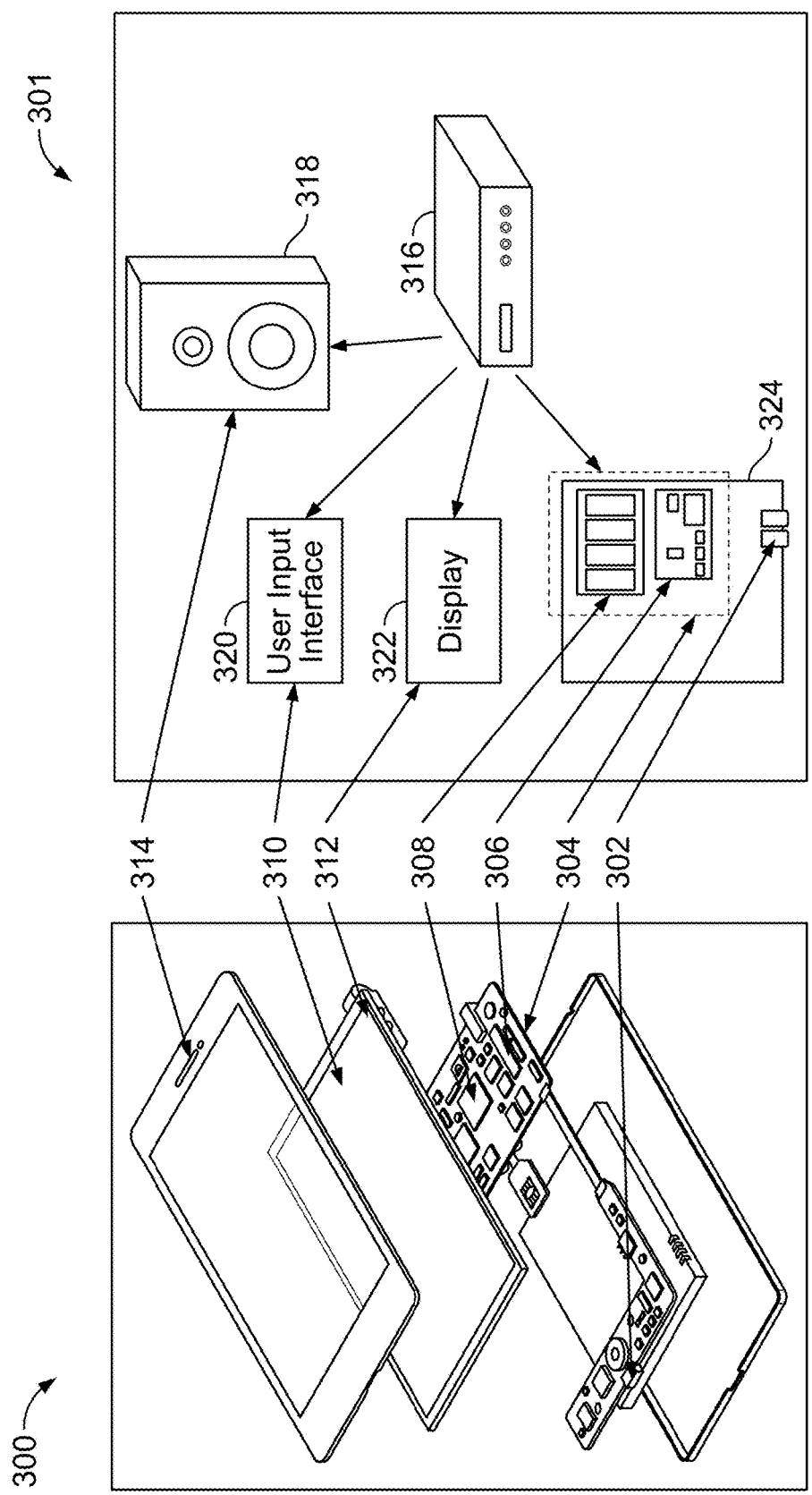
FIG. 3 shows illustrative examples of a user equipment device, in accordance with some embodiments of the disclosure.

Users may access content and the media guidance application (and its display screens described above and below) from one or more of their user equipment devices. FIG. 3 shows generalized embodiments of illustrative user equipment device 300 and illustrative user equipment system 301. For example, user equipment device 300 can be a smartphone device. In another example, user equipment system 301 can be a user television equipment system. User equipment system 301 may comprise a set top box 316. Set top box 316 may be communicatively connected to speaker 318 and display 322. In some embodiments, display 322 may be a television display or a computer display. In some embodiments, set top box 316 may be communicatively connected to user interface input 320. In some embodiments, user interface input 320 may be a remote control device. Set top box 316 may include circuit board 324. In some embodiments, circuit board 324 may include processing circuitry, control circuitry, and storage (e.g., RAM, ROM, Hard Disk, Removable Disk, etc.). In some embodiments, circuit board 324 may include an input/output path. More specific implementations of user equipment devices are discussed below in connection with FIG. 4. Each one of user equipment device 300 and user equipment system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of each one of user equipment device 300 and user equipment system 301. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from each one of user equipment device 300 and user equipment system 301, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on each one of user equipment device 300 and user equipment system 301. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on each one of user equipment device 300 and user equipment system 301 is retrieved on-demand by issuing requests to a server remote to each one of the user equipment device 300 and the user equipment system 301. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on each one of equipment device 300 and equipment system 301. This way, the processing of the instructions is performed remotely by the server while the resulting displays are provided locally on each one of equipment device 300 and equipment system 301. Each one of equipment device 300 and equipment system 301 may receive inputs from the user via input interface 310 and transmit those inputs to the remote server for processing and generating the corresponding displays. For example, each one of equipment device 300 and equipment system 301 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to each one of equipment device 300 and equipment system 301 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
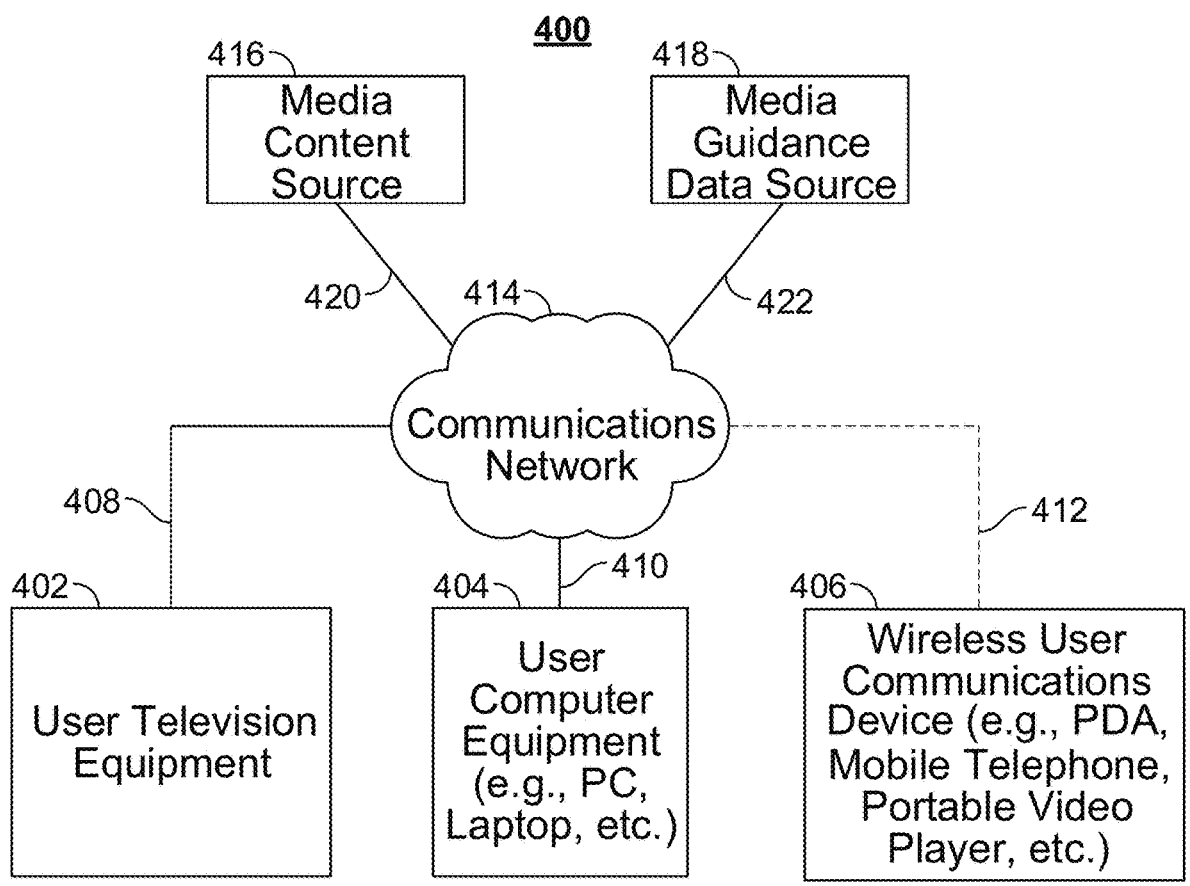
FIG. 4 is a block diagram of an illustrative media system, in accordance with some embodiments of the disclosure.

Each one of user equipment device 300 and user equipment system 301 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of each one of a user equipment device 300 and 301. In some embodiments, media guidance applications may be client-server applications where only a client application resides on the user equipment device, and server application resides on a remote server. For example, media guidance applications may be implemented partially as a client application on control circuitry 304 of each one of user equipment device 300 and user equipment system 301 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
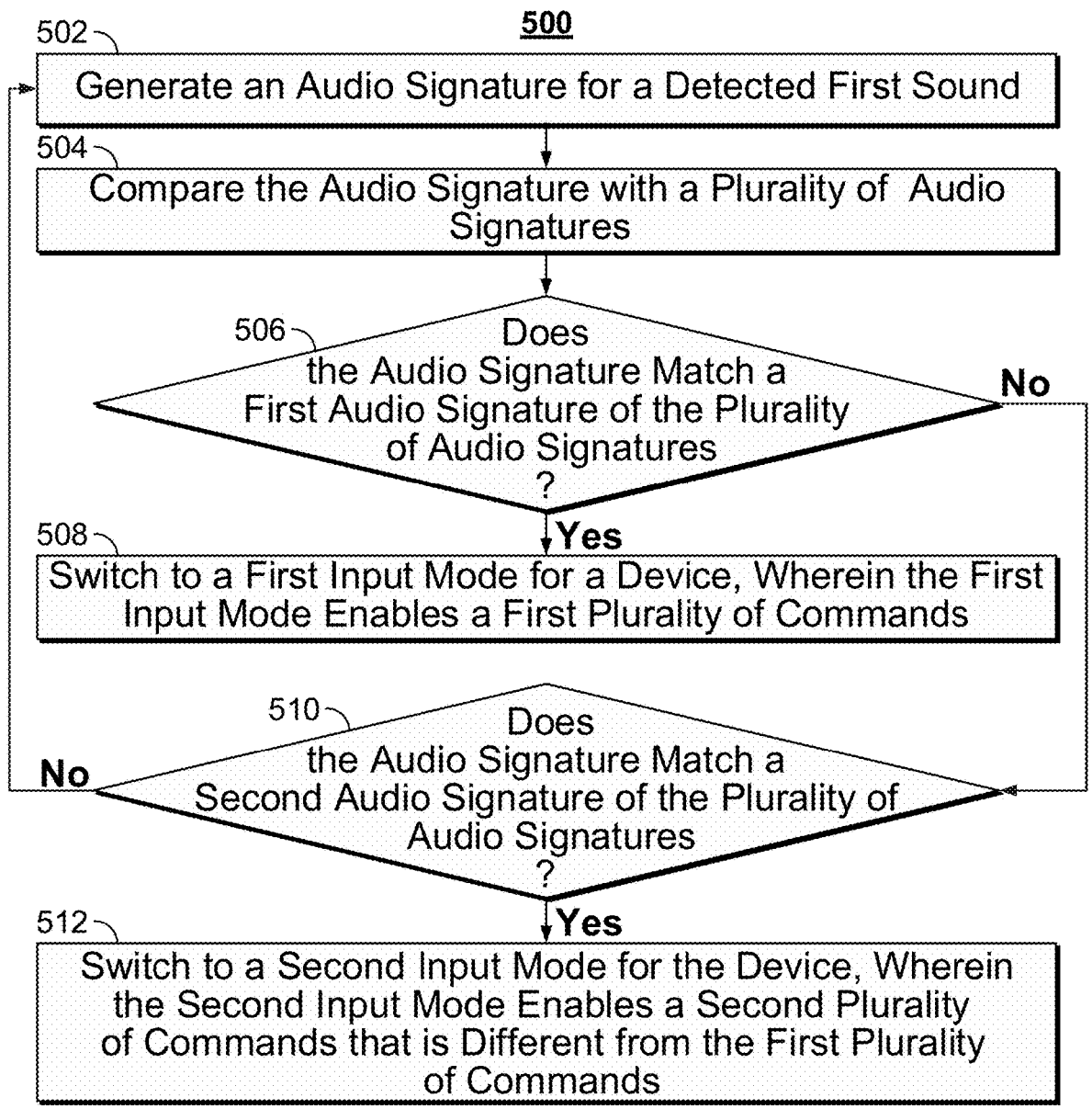
FIG. 5 is a flowchart of a process for enabling a mode of operation based on an audio trigger, in accordance with some embodiments of the disclosure.

FIG. 5 is a flowchart of a process for enabling a mode of operation based on an audio trigger, in accordance with some embodiments of the disclosure. In some embodiments, process 500 or any step thereof may be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 500 may be incorporated into or combined with one or more steps of any other process or embodiment described herein.

At 502, the media guidance application (e.g., via control circuitry 304) generates an audio signature for a detected first sound. For example, the media guidance application may detect a subway announcement (e.g., "The next stop is Fulton Street") as the first sound and generate an audio signature via processing circuitry 306 for the first sound. In another example, the media guidance application may detect a microwave alarm sound as the first sound and generate an audio signature via processing circuitry 306 for the first sound. In one example, the media guidance application may generate an audio signature by recording a time-domain sampling of the sound. In another example, the media guidance application may generate an audio signature by performing a fast Fourier transform on a time-domain sampling of the sound to produce a frequency-domain representation of the sound. The generated audio signature may be stored in storage 308.

At 504, the media guidance application (e.g., via control circuitry 304) compares the audio signature with a plurality of audio signatures. For example, the media guidance application may compare the audio signature with a plurality of audio signatures retrieved from storage 308 and/or media guidance data source 418 via communications network 414.

At 506, the media guidance application (e.g., via control circuitry 304) determines whether the audio signature matches a first audio signature of the plurality of audio signatures. For example, the media guidance application may determine that the first audio signature matches one of the plurality of audio signatures if the frequency difference and power difference between peak points of the audio signatures are below respective thresholds. In response to determining that the audio signature matches a first audio signature of the plurality of audio signatures, process 500 proceeds to 508. Otherwise, process 500 proceeds to 510.

At 508, the media guidance application (e.g., via control circuitry 304) switches to a first input mode for a device, wherein the first input mode enables a first plurality of commands. For example, the media guidance application may switch to a first input mode that enables a command to pause playback (e.g., on user television equipment 402, user computer equipment 404, and/or wireless user communications device 406), a command to retrieve and display walking directions to a destination (e.g., from media content source 416 and/or media guidance data source 418), and a command to switch to an audio-only media asset (e.g., on user television equipment 402, user computer equipment 404, and/or wireless user communications device 406).

At 510, the media guidance application (e.g., via control circuitry 304) determines whether the audio signature matches a second audio signature of the plurality of audio signatures. For example, the media guidance application may determine that the first audio signature matches a second audio signature of the plurality of audio signatures if the frequency difference and power difference between peak points of the audio signatures are below respective thresholds. In response to determining that the audio signature matches a second audio signature of the plurality of audio signatures, process 500 proceeds to 512. Otherwise, process 500 proceeds to 502.

At 512, the media guidance application (e.g., via control circuitry 304) switches to a second input mode for the device, wherein the second input mode enables a second plurality of commands that is different from the first plurality of commands For example, the media guidance application may switch to a second input mode that enables a command to pause playback (e.g., on user television equipment 402, user computer equipment 404, and/or wireless user communications device 406), a command to resume playback (e.g., on user television equipment 402, user computer equipment 404, and/or wireless user communications device 406), and a command to increase volume of playback (e.g., through speakers 314).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 5.

Figure 6:
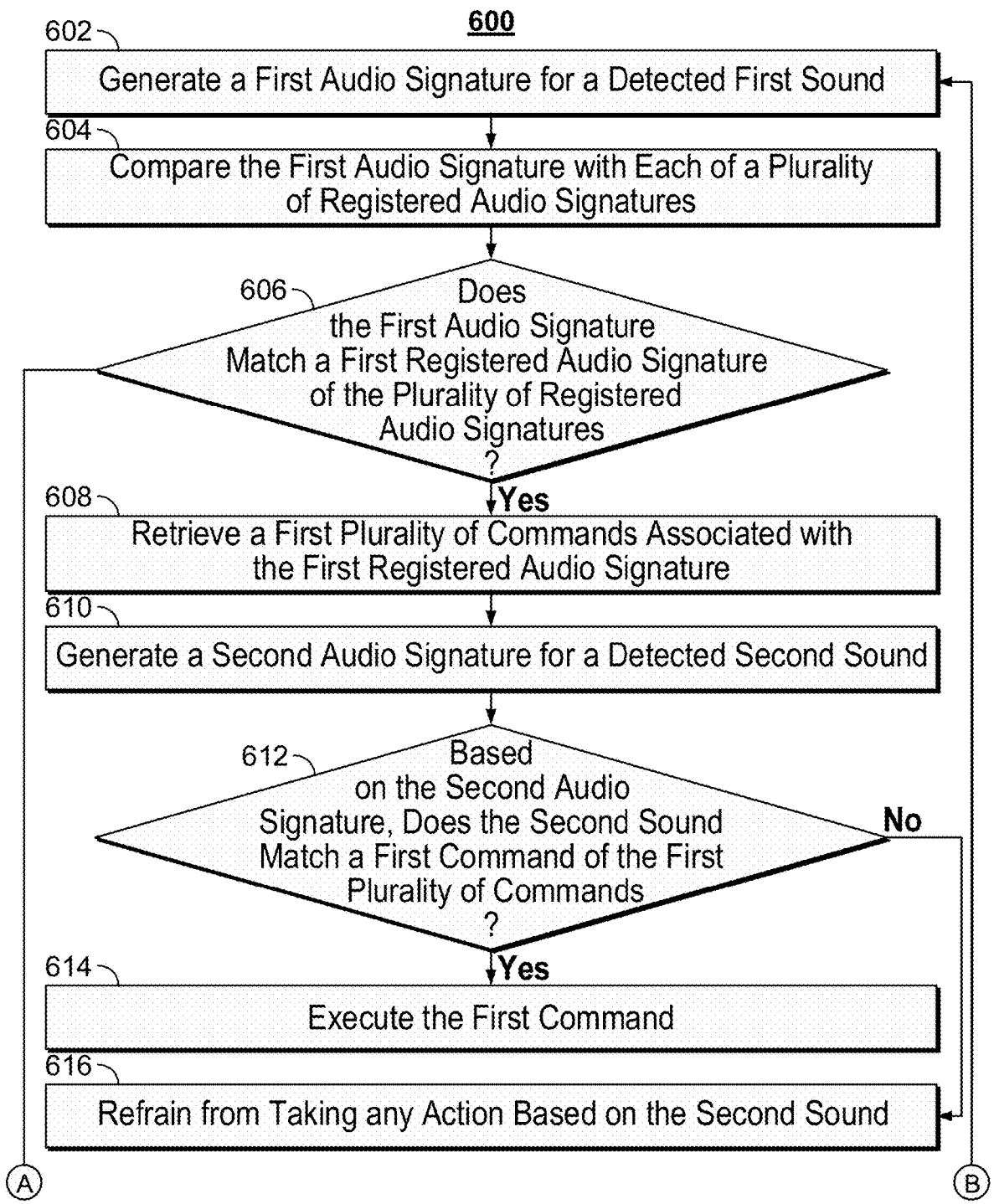
FIG. 6 is a flowchart of a process for enabling different modes of operation based on an audio trigger, in accordance with some embodiments of the disclosure.
Figure 6:
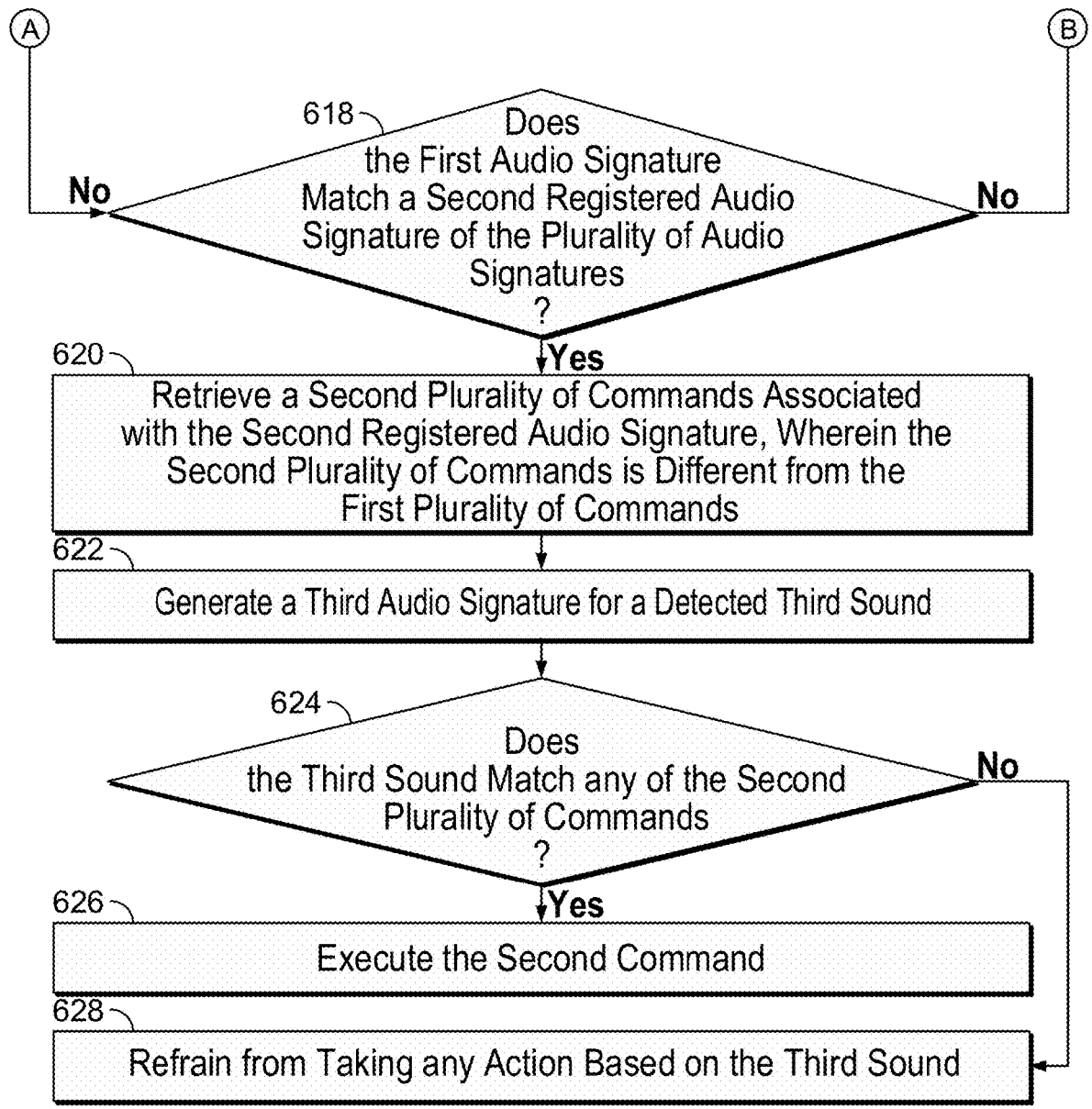

FIG. 6 is a flowchart of a process for enabling different modes of operation based on an audio trigger, in accordance with some embodiments of the disclosure. In some embodiments, process 600 or any step thereof may be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 600 may be incorporated into or combined with one or more steps of any other process or embodiment described herein.

At 602, the media guidance application (e.g., via control circuitry 304) generates a first audio signature for a detected first sound. For example, the media guidance application may detect a subway announcement (e.g., "The next stop is Fulton Street") as the first sound and generate an audio signature via processing circuitry 306 for the first sound. In another example, the media guidance application may detect a microwave alarm sound as the first sound and generate an audio signature via processing circuitry 306 for the first sound. The generated audio signature may be stored, for example, in storage 308.

At 604, the media guidance application (e.g., via control circuitry 304) compares the first audio signature with each of a plurality of registered audio signatures. For example, the media guidance application may compare the first audio signature for the subway announcement with each of a plurality of registered audio signatures stored in storage 308 or retrieved from media guidance data source 418. The media guidance application may compare the first audio signature with each of the plurality of registered audio signatures by, for example, extracting a peak point comprising a frequency value and average power value from a spectrogram of each audio signature, respectively, and computing a frequency difference value and power difference value.

At 606, the media guidance application (e.g., via control circuitry 304) determines whether the first audio signature matches a first registered audio signature of the plurality of registered audio signatures. For example, the media guidance application may determine that the first audio signature matches one of the plurality of registered audio signatures if the frequency difference and power difference between peak points of the audio signatures are below respective thresholds. In response to determining that the first audio signature matches a first registered audio signature of the plurality of registered audio signatures, process 600 proceeds to 608. Otherwise, process 600 proceeds to 618.

At 608, the media guidance application (e.g., via control circuitry 304) retrieves a first plurality of commands associated with the first registered audio signature. For example, the media guidance application may retrieve, from storage 308 or media guidance data source 418, a command to pause playback (e.g., on user television equipment 402, user computer equipment 404, and/or wireless user communications device 406), a command to retrieve and display walking directions to a destination (e.g., from media content source 416 and/or media guidance data source 418), and a command to switch to an audio-only media asset (e.g., on user television equipment 402, user computer equipment 404, and/or wireless user communications device 406), where these commands are associated with the first registered audio signature matching the subway announcement.

At 610, the media guidance application (e.g., via control circuitry 304) generates a second audio signature for a detected second sound. For example, the media guidance application may detect a user utterance (e.g., "Navigate to doctor's office") as the second sound and generate an audio signature via processing circuitry 306 for the second sound. The generated audio signature may be stored, for example, in storage 308.

At 612, the media guidance application (e.g., via control circuitry 304) determines whether the second sound matches a first command of the first plurality of commands. For example, the media guidance application may determine whether the audio signature generated for an utterance of the phrase "navigate to doctor's office" matches any of a command to pause playback, a command to retrieve and display walking directions to a destination, and a command to switch to an audio-only media asset. The media guidance application may determine, for example, that the audio signature generated for an utterance of the phrase "navigate to doctor's office" matches a command to retrieve and display walking directions to a destination. In response to determining that the second sound matches a first command of the first plurality of commands, process 600 proceeds to 614. Otherwise, process 600 proceeds to 616.

At 614, the media guidance application (e.g., via control circuitry 304) executes the first command. For example, the media guidance application may retrieve directions to the address of a destination from storage 308, media content source 416, and/or media guidance data source 418 and generate the directions for display on display 312 and/or user input interface 310.

At 616, the media guidance application (e.g., via control circuitry 304) refrains from taking any action based on the second sound. For example, the media guidance application may return to a listening state to detect another sound while the first plurality of commands is still enabled. In another example, after a particular period of time (e.g., 30 seconds) has passed, the media guidance application may return to a listening state where no commands are enabled.

At 618, the media guidance application (e.g., via control circuitry 304) determines whether the first audio signature matches a second registered audio signature of the plurality of registered audio signatures. For example, the media guidance application may determine that the first audio signature matches a second registered audio signature of the plurality of registered audio signatures if the frequency difference and power difference between peak points of the audio signatures are below respective thresholds. In response to determining that the first audio signature matches a second registered audio signature of the plurality of audio signatures, process 600 proceeds to 620. Otherwise, process 600 proceeds to 602.

At 620, the media guidance application (e.g., via control circuitry 304) retrieves a second plurality of commands associated with the second registered audio signature, wherein the second plurality of commands is different from the first plurality of commands. For example, the media guidance application may retrieve, from storage 308 or media guidance data source 418, a command to pause playback (e.g., on user television equipment 402, user computer equipment 404, and/or wireless user communications device 406), a command to resume playback (e.g., on user television equipment 402, user computer equipment 404, and/or wireless user communications device 406), and a command to increase volume of playback (e.g., through speakers 314), where these commands are associated with the first registered audio signature matching the microwave alarm sound.

At 622, the media guidance application (e.g., via control circuitry 304) generates a third audio signature for a detected third sound. For example, the media guidance application may detect a user utterance (e.g., "Play") as the third sound and generate an audio signature via processing circuitry 306 for the third sound. The generated audio signature may be stored, for example, in storage 308.

At 624, the media guidance application (e.g., via control circuitry 304) determines whether the third sound matches any of the second plurality of commands For example, the media guidance application may determine whether the audio signature generated for an utterance of the word "play" matches any of a command to pause playback, a command to resume playback, and a command to increase volume of playback. The media guidance application may determine, for example, that the audio signature generated for an utterance of the word "pause" matches a command to pause playback of a media asset. In response to determining that the third sound matches any of the second plurality of commands, process 600 proceeds to 626. Otherwise, process 600 proceeds to 628.

At 626, the media guidance application (e.g., via control circuitry 304) executes the second command. For example, the media guidance application may pause playback of media content playing back on user television equipment 402, user computer equipment 404, and/or wireless user communications device 406.

At 628, the media guidance application (e.g., via control circuitry 304) refrains from taking any action based on the third sound. For example, the media guidance application may return to a listening state to detect another sound while the second plurality of commands are still enabled. In another example, after a particular period of time (e.g., 30 seconds) has passed, the media guidance application may return to a listening state where no commands are enabled.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 6.

Figure 7:
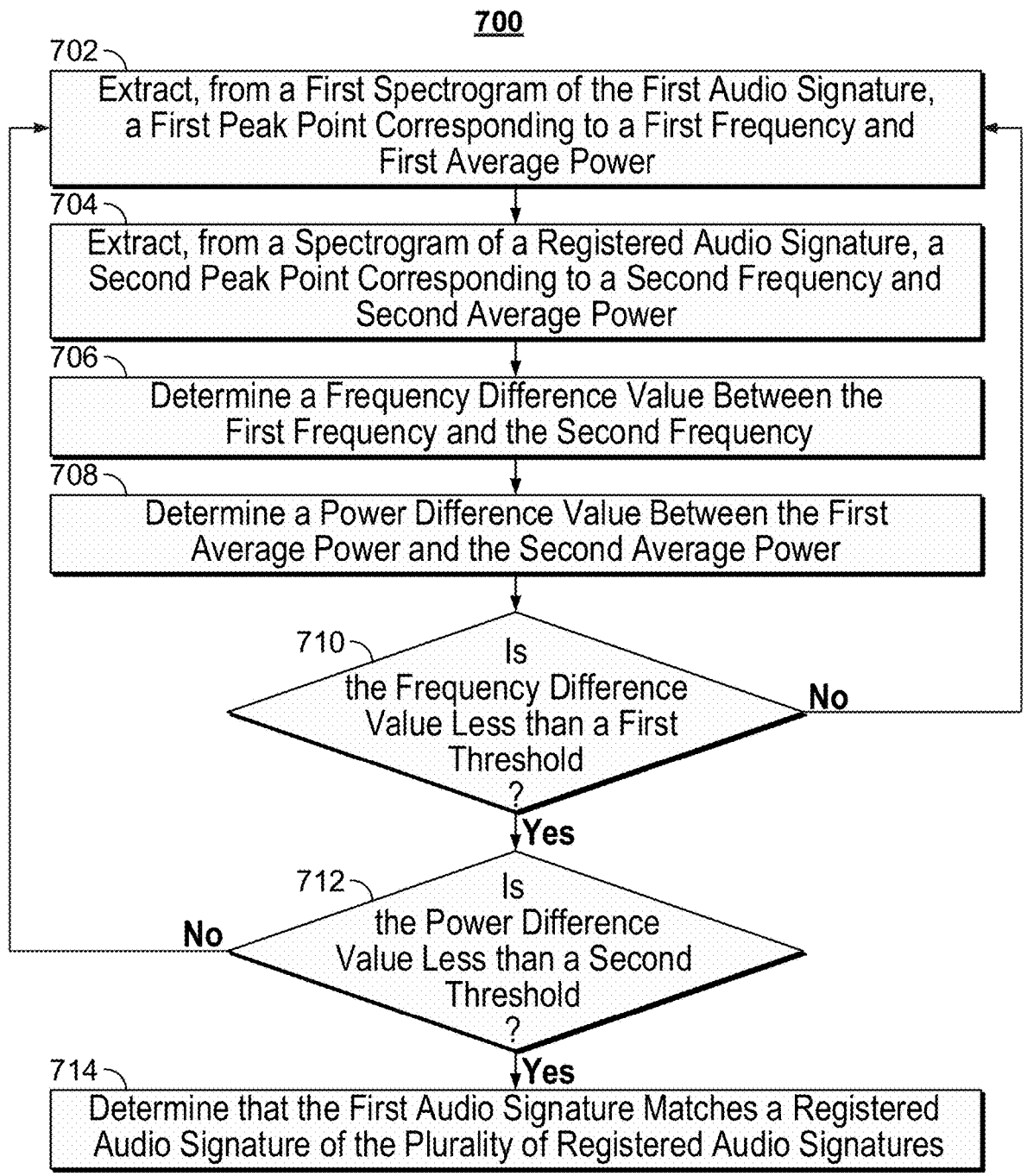
FIG. 7 is a flowchart of a process for determining whether a first audio signature matches any of a plurality of registered audio signatures, in accordance with some embodiments of the disclosure.

FIG. 7 is a flowchart of a process for determining whether a first audio signature matches any of a plurality of registered audio signatures, in accordance with some embodiments of the disclosure. In some embodiments, process 700 or any step thereof may be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 700 may be incorporated into or combined with one or more steps of any other process or embodiment described herein.

At 702, the media guidance application (e.g., via control circuitry 304) extracts, from a first spectrogram of the first audio signature, a first peak point corresponding to a first frequency and first average power. The spectrogram of the audio signature may, for example, be normalized or weighted. For example, the media guidance application may extract a first peak point corresponding to a first frequency of 130 Hz and a first average power of 70 dB.

At 704, the media guidance application (e.g., via control circuitry 304) extracts, from a spectrogram of a registered audio signature, a second peak point corresponding to a second frequency and second average power. The spectrogram of the audio signature may, for example, be normalized or weighted. For example, the media guidance application may extract a second peak point corresponding to a second frequency of 155 Hz and a second average power of 65 dB.

At 706, the media guidance application (e.g., via control circuitry 304) determines a frequency difference value between the first frequency and the second frequency. For example, the media guidance application may determine the frequency difference value to be the absolute value of the difference between 130 Hz and 155 Hz, which is 25 Hz.

At 708, the media guidance application (e.g., via control circuitry 304) determines a power difference value between the first average power and the second average power. For example, the media guidance application may determine the power difference value to be the absolute value of the difference between 70 dB and 65 dB, which is 5 dB.

At 710, the media guidance application (e.g., via control circuitry 304) determines whether the frequency difference value is less than a first threshold. For example, the media guidance application may retrieve the first threshold from storage 308 or media guidance data source 418. For example, the media guidance application may determine whether the frequency difference value of 25 Hz is less than a first threshold value of 40 Hz. In response to determining that the frequency difference value is less than the first threshold, process 700 proceeds to 712. Otherwise, process 700 proceeds to 702.

At 712, the media guidance application (e.g., via control circuitry 304) determines whether the power difference value is less than a second threshold. For example, the media guidance application may retrieve the second threshold from storage 308 or media guidance data source 418. For example, the media guidance application may determine whether the power difference value of 5 dB is less than a first threshold value of 10 dB. In response to determining that the power difference value is less than the second threshold, process 700 proceeds to 714. Otherwise, process 700 proceeds to 702.

At 714, the media guidance application (e.g., via control circuitry 304) determines that the first audio signature matches a registered audio signature of the plurality of registered audio signatures. For example, the media guidance application may determine, based on the frequency difference value being less than the first threshold and the power difference value being less than the second threshold, that the first audio signature matches the registered audio signature.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 7.

Figure 8:
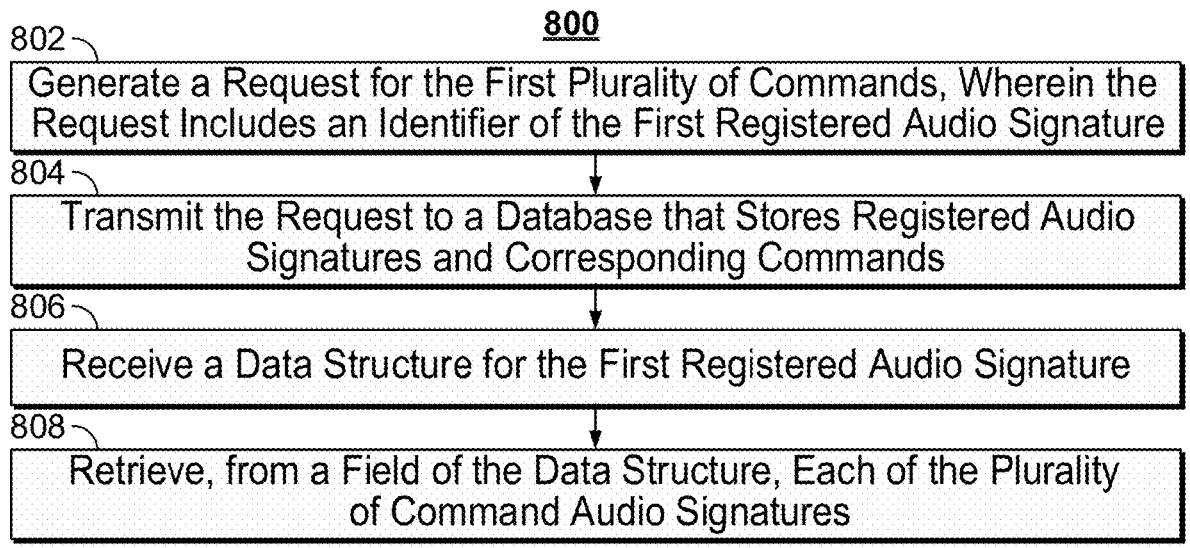
FIG. 8 is a flowchart of a process for retrieving a first plurality of commands associated with a first registered audio signature, in accordance with some embodiments of the disclosure.

FIG. 8 is a flowchart of a process for retrieving a first plurality of commands associated with a first registered audio signature, in accordance with some embodiments of the disclosure. In some embodiments, process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 800 may be incorporated into or combined with one or more steps of any other process or embodiment described herein.

At 802, the media guidance application (e.g., via control circuitry 304) generates a request for the first plurality of commands, wherein the request includes an identifier of the first registered audio signature. For example, the media guidance application may generate a request that includes an identifier of the first registered audio signature that matched the audio signature of the subway announcement. The identifier may be, for example, an alphanumeric string or a hexadecimal code. In another example, the identifier may be an encoded version of the first registered audio signature.

At 804, the media guidance application (e.g., via control circuitry 304) transmits the request to a database that stores registered audio signatures and corresponding commands. For example, the media guidance application may transmit the request to media guidance data source 418 via communications network 414.

At 806, the media guidance application (e.g., via control circuitry 304) receives a data structure for the first registered audio signature. For example, the media guidance application may receive the data structure from media guidance data source 418 via communications network 414. The media guidance application may, for example, store the data structure in storage 308.

At 808, the media guidance application (e.g., via control circuitry 304) retrieves, from a field of the data structure, each of the plurality of command audio signatures. For example, the media guidance application may retrieve each of the plurality of command audio signatures associated with the first registered audio signature that matched the audio signature of the subway announcement and store the command audio signatures in, for example, storage 308.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 8.

Figure 9:
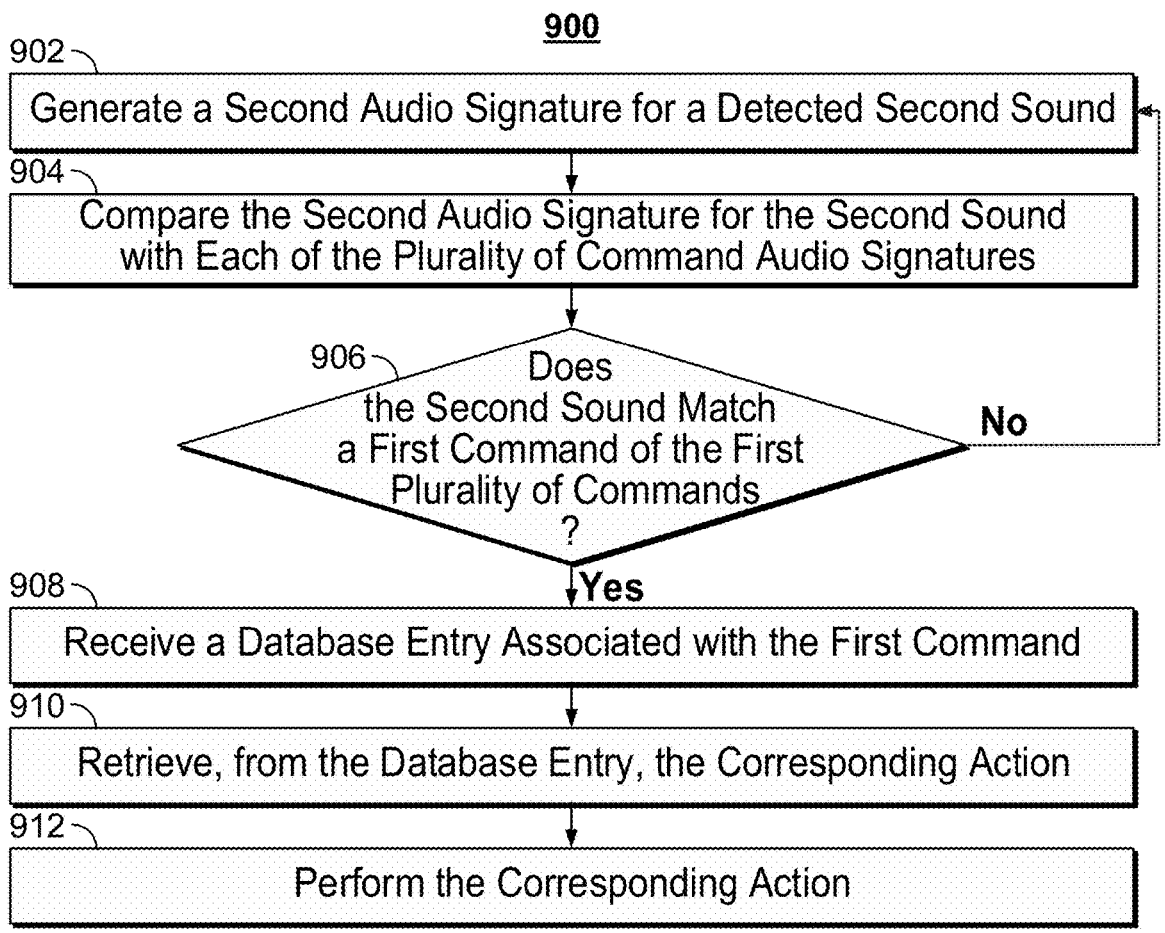
FIG. 9 is a flowchart of a process for determining whether a second sound matches a retrieved plurality of commands and executing an action corresponding to the matching command, in accordance with some embodiments of the disclosure.

FIG. 9 is a flowchart of a process for determining whether a second sound matches a retrieved plurality of commands and executing an action corresponding to the matching command, in accordance with some embodiments of the disclosure. In some embodiments, process 900 or any step thereof may be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 900 may be incorporated into or combined with one or more steps of any other process or embodiment described herein.

At 902, the media guidance application (e.g., via control circuitry 304) generates a second audio signature for a detected second sound. For example, the media guidance application may detect a user utterance (e.g., "Play") as the second sound and generate an audio signature via processing circuitry 306 for the second sound. The generated audio signature may be stored, for example, in storage 308.

At 904, the media guidance application (e.g., via control circuitry 304) compares the second audio signature for the second sound with each of the plurality of command audio signatures. For example, the media guidance application may compare the audio signature generated for an utterance of the word "play" with a command to pause playback, a command to resume playback, and a command to increase volume of playback.

At 906, the media guidance application (e.g., via control circuitry 304) determines whether the second sound matches a first command of the first plurality of commands. For example, the media guidance application may determine whether the audio signature generated for an utterance of the word "play" matches a command to pause playback, a command to resume playback, and a command to increase volume of playback. The media guidance application may, for example, determine that the audio signature generated for an utterance of the word "play" matches a command to resume playback. In response to determining that the second sound matches a first command of the first plurality of commands, process 900 proceeds to 908. Otherwise, process 900 proceeds to 902.

At 908, the media guidance application (e.g., via control circuitry 304) receives a database entry associated with the first command. For example, the media guidance application may receive a database entry from media guidance data source 418 an/or storage 308. The database entry may, for example, comprise a field for a command and/or command audio signature and a field for a corresponding action.

At 910, the media guidance application (e.g., via control circuitry 304) retrieves, from the database entry, the corresponding action. For example, the media guidance application may retrieve, from the database entry associated with the command to resume playback, a corresponding action to resume playback of media content on a user device.

At 912, the media guidance application (e.g., via control circuitry 304) performs the corresponding action. For example, the media guidance application may resume playback on user television equipment 402, user computer equipment 404, and/or wireless user communications device 406.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 9.

Figure 10:
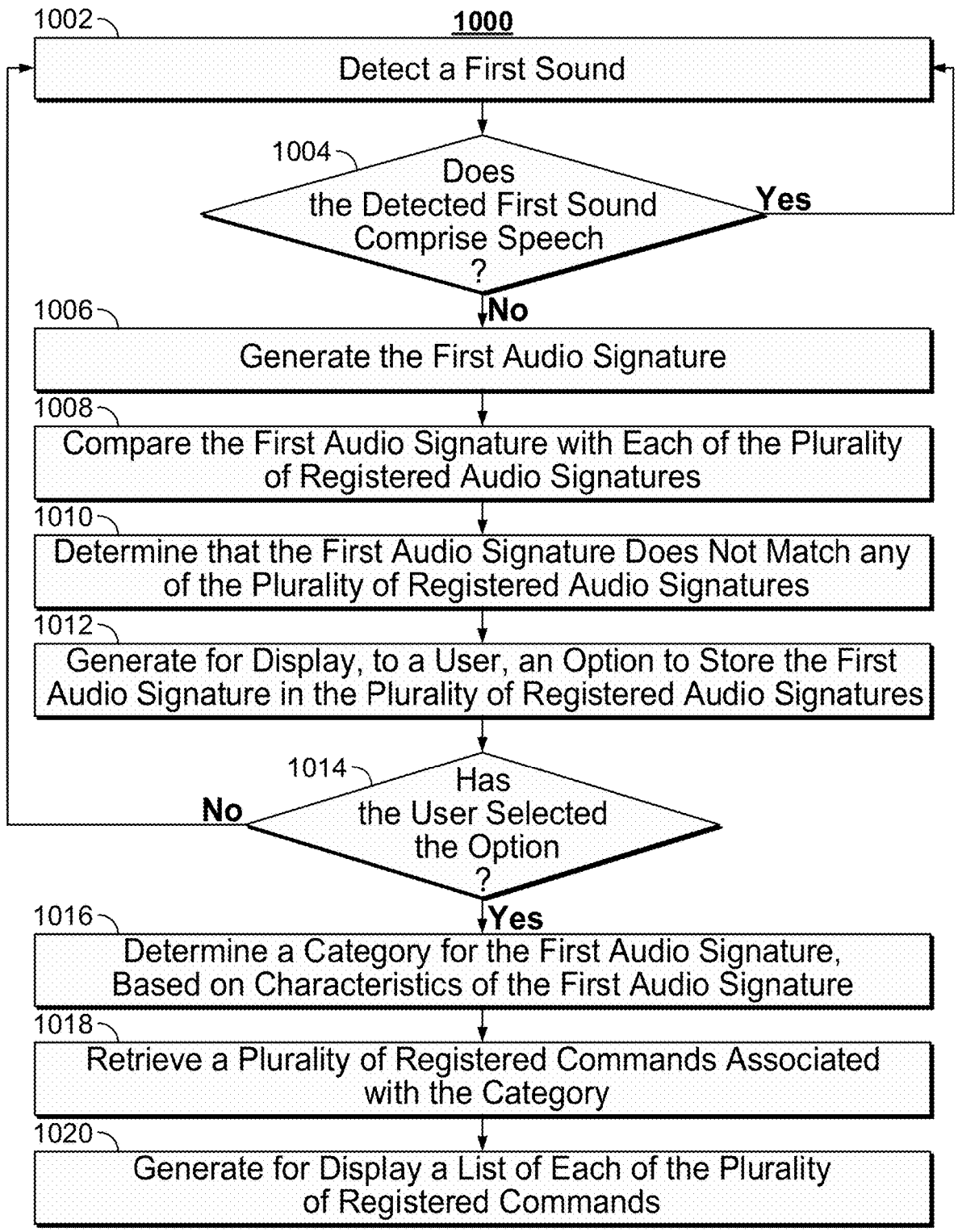
FIG. 10 is a flowchart of a process for providing a user with the option to register an unregistered audio signature, in accordance with some embodiments of the disclosure.

FIG. 10 is a flowchart of a process for providing a user with the option to register an unregistered audio signature, in accordance with some embodiments of the disclosure. In some embodiments, process 1000 or any step thereof may be performed on, or provided by, any of the devices shown in FIGS. 3-4. For example, process 1000 may be executed by control circuitry 304 (FIG. 3) as instructed by a media guidance application implemented on a user device (e.g., user equipment devices 402, 404, and/or 406 (FIG. 4)) in order to modify visual attributes of an input of a user input device. In addition, one or more steps of process 1000 may be incorporated into or combined with one or more steps of any other process or embodiment described herein.

At 1002, the media guidance application (e.g., via control circuitry 304) detects a first sound. For example, the media guidance application may detect a subway announcement of "The next stop is Fulton Street." In another example, the media guidance application may detect a fire alarm sound.

At 1004, the media guidance application (e.g., via control circuitry 304) determines whether the detected first sound comprises speech. For example, the media guidance application may determine an average frequency of the detected first sound and determine whether the average frequency falls within a frequency range of human speech (e.g., 85 to 180 Hz for men or 165 to 255 Hz for women). For example, the media guidance application may determine that the subway announcement comprises speech. In another example, the media guidance application may determine that the fire alarm sound does not comprise speech. In some embodiments, the media guidance application may determine whether a detected first sound predominantly comprises speech or does not predominantly comprise speech, where, in the latter case, though speech may be present in the detected first sound, it is not considered a predominant or significant component of the sound. In response to determining that the detected first sound comprises speech, process 1000 proceeds to 1002. Otherwise, process 1000 proceeds to 1006.

At 1006, the media guidance application (e.g., via control circuitry 304) generates the first audio signature. For example, the media guidance application may perform a Fourier transform on a time-domain representation of the detected first sound of the microwave alarm to generate the first audio signature. The media guidance application may, for example, store the first audio signature in storage 308.

At 1008, the media guidance application (e.g., via control circuitry 304) compares the first audio signature with each of the plurality of registered audio signatures. For example, the media guidance application may compare the first audio signature for the fire alarm sound with each of a plurality of registered audio signatures retrieved from storage 308 or media guidance data source 418.

At 1010, the media guidance application (e.g., via control circuitry 304) determines that the first audio signature does not match any of the plurality of registered audio signatures. For example, the media guidance application may determine that the microwave alarm sound does not match any of the registered audio signatures.

At 1012, the media guidance application (e.g., via control circuitry 304) generates for display, to a user, an option to store the first audio signature in the plurality of registered audio signatures. For example, the media guidance application may generate an option to the user on display 312 and/or user input interface 310.

At 1014, the media guidance application (e.g., via control circuitry 304) determines whether the user has selected the option. For example, the media guidance application may determine whether an input associated with the option (e.g., a touchscreen button) has been selected by the user. In response to determining that the user has selected the option, process 1000 proceeds to 1016. Otherwise, process 1000 proceeds to 1002.

At 1016, the media guidance application (e.g., via control circuitry 304) determines a category for the first audio signature, based on characteristics of the first audio signature. For example, the media guidance application may, based on frequency-domain (e.g., high frequency/pitch) or time-domain (e.g., repetition) characteristics of the first audio signature, determine that the first audio signature is associated with the category of alarms.

At 1018, the media guidance application (e.g., via control circuitry 304) retrieves a plurality of registered commands associated with the category. For example, the media guidance application may retrieve the plurality of registered commands associated with the category from storage 308 and/or media guidance data source 418. For example, the plurality of registered commands associated with the alarms category may include a command to pause media content playback, a command to rewind media content by 30 seconds, a command to increase media content playback volume, a command to make a phone call (e.g., to 911), a command to turn on lights connected to a smart home system, and a command to turn on a coffeemaker.

At 1020, the media guidance application (e.g., via control circuitry 304) generates for display a list of each of the plurality of registered commands. For example, the media guidance application may generate for display the list of the registered commands on display 312 and/or user interface 310. In some embodiments, the media guidance application may determine that the user has selected one or more of the displayed commands. In some embodiments, in response to determining that the user has selected one or more of the displayed commands, the media guidance application may store the first audio signature in the plurality of registered audio signatures and associate the one or more selected displayed commands with the stored signature.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
operating a voice assistant device in a first mode, wherein:
while operating the voice assistant device in the first mode,
the voice assistant device is constrained such that it is limited to detect and respond only to a first set of voice commands; and
receiving a first audio input while operating the voice assistant device in the first mode causes the voice assistant device to:
in response to determining the first audio input matches a voice command of the first set of voice commands, respond to the first audio input; and
in response to determining the first audio input does not match a voice command of the first set of voice commands, ignore the first audio input;
detecting a non-speech second audio input; and
in response to determining that the second audio input matches a stored audio signature associated with a second mode, switching the voice assistant device to operating in the second mode, wherein: while operating in the second mode,
the voice assistant device is constrained such that it is limited to detect and respond only to a second set of voice commands different from the first set of voice commands; and
receiving a third audio input while operating the voice assistant device in the second mode causes the voice assistant device to:
in response to determining the third audio input matches a voice command of the second set of voice commands, responding to the third audio input; and
in response to determining the third audio input does not match a voice command of the second set of voice commands, ignoring the third audio input.

2. The method of claim 1, further comprising:
retrieving the second set of voice commands associated with the second mode, the second set of voice commands comprising voice commands related to an environment at which the voice assistant device is located.

3. The method of claim 1, further comprising:
after determining that the voice assistant device is being operated in the first mode, receiving a voice command that is in the first set of voice commands; and
executing an action associated with the voice command that is in the first set of voice commands.

4. The method of claim 1, further comprising:
determining a first spectrogram of the second audio input;
extracting a first peak point corresponding to a first frequency and a first average power from the first spectrogram;
retrieving a second spectrogram of the stored audio signature; and
extracting a second peak point corresponding to a second frequency and a second average power from the second spectrogram.

5. The method of claim 4, further comprising:
determining a frequency difference value between the first frequency and the second frequency; and
determining whether the frequency difference value is less than a first threshold.

6. The method of claim 4, further comprising:
determining a power difference value between the first average power and the second average power; and
determining whether the power difference value is less than a second threshold.

7. The method of claim 5, further comprising:
based on determining that both the frequency difference value is less than the first threshold and a power difference value is less than a second threshold, determining that the second audio input matches the stored audio signature.

8. The method of claim 1, wherein the second audio input comprises at least one of a microwave alarm sound or a subway announcement.

9. The method of claim 1, wherein the second audio input is a trigger to switching from the first mode to the second mode.

10. The method of claim 1, wherein the first set of voice commands is different than the stored audio signature associated with the second mode.

11. A system comprising:
control circuitry configured to:
operate a voice assistant device in a first mode, wherein: while operating the voice assistant device in the first mode
the voice assistant device is constrained such that it is limited to detect and respond only to a first set of voice commands; and
receiving a first audio input while operating the voice assistant device in the first mode causes the voice assistant device to:

in response to determining the first audio input matches a voice command of the first set of voice commands, respond to the first audio input; and in response to determining the first audio input does not match a voice command of the first set of voice commands, ignore the first audio input; snd input/output circuitry configured to:
detect a non-speech second audio input; and
wherein the control circuitry is further configured to:
in response to determining that the second audio input matches a stored audio signature associated with a second mode, switch the voice assistant device to operate in the second mode, wherein:
while operating in the second mode
the voice assistant device is constrained such that it is limited to detect and respond only to a second set of voice commands different from the first set of voice commands; and
receiving a third audio input while operating the voice assistant device in the second mode causes the voice assistant device to:
in response to determining the third audio input matches a voice command of the second set of voice commands, respond to the third audio input; and
in response to determining the third audio input does not match a voice command of the second set of voice commands, ignore the third audio input.

12. The system of claim 11, wherein the control circuitry is further configured to:
retrieve the second set of voice commands associated with the second mode, wherein the second set of voice commands comprises voice commands related to an environment at which the voice assistant device is located.

13. The system of claim 11, wherein the control circuitry is further configured to:
after determining that the voice assistant device is being operated in the first mode, receive a voice command that is in the first set of voice commands; and execute an action associated with the voice command that is in the first set of voice commands.

14. The system of claim 11, wherein the control circuitry is further configured to:
determine a first spectrogram of the second audio input;
extract a first peak point corresponding to a first frequency and a first average power from the first spectrogram;
retrieve a second spectrogram of the stored audio signature; and
extract a second peak point corresponding to a second frequency and a second average power from the second spectrogram.

15. The system of claim 14, wherein the control circuitry is further configured to:
determine a frequency difference value between the first frequency and the second frequency; and
determine whether the frequency difference value is less than a first threshold.

16. The system of claim 14, wherein the control circuitry is further configured to:
determine a power difference value between the first average power and the second average power; and
determine whether the power difference value is less than a second threshold.

17. The system of claim 15, wherein the control circuitry is further configured to:
based on determining that both the frequency difference value is less than the first threshold and a power difference value is less than a second threshold, determine that the second audio input matches the stored audio signature.

18. The system of claim 11, wherein the second audio input comprises at least one of a microwave alarm sound or a subway announcement.

19. The system of claim 11, wherein the second audio input is a trigger to switching from the first mode to the second mode.

20. The system of claim 11, wherein the first set of voice commands is different than the stored audio signature associated with the second mode.

* * * * *